(12) United States Patent
Stengel et al.

(10) Patent No.: US 7,448,291 B2
(45) Date of Patent: Nov. 11, 2008

(54) METHOD FOR ERROR RECOGNITION AND ERROR AVOIDANCE WHEN SWITCHING AN AUTOMATED GEARBOX AS WELL AS AN AUTOMATED GEARBOX

(75) Inventors: Frank Stengel, Buehl-Neusatz (DE); Alexander Schweizer, Buehl (DE); Martin Zimmermann, Sasbach (DE); Behzad Nazari, Nuertingen (DE); Joachim Hirt, Oberkirch (DE); Martin Fuss, Karlsruhe (DE); Matthias Ehrlich, Buehl (DE); Jens Martin, Sinzheim-Kartung (DE)

(73) Assignee: LuK Lamellen und Kupplungsbau Beteiligungs KG, Beuhl (DE)

( * ) Notice: Subject to any disclaimer, the term of this patent is extended or adjusted under 35 U.S.C. 154(b) by 270 days.

(21) Appl. No.: 11/162,181

(22) Filed: Aug. 31, 2005

(65) Prior Publication Data

US 2006/0096398 A1    May 11, 2006

(30) Foreign Application Priority Data

Sep. 2, 2004    (DE) .................. 10 2004 042 424

(51) Int. Cl.
*F16H 59/00*    (2006.01)
*F16H 61/00*    (2006.01)
*F16H 63/00*    (2006.01)

(52) U.S. Cl. .................. 74/335; 74/340; 477/906
(58) Field of Classification Search ............. None
See application file for complete search history.

(56) References Cited

U.S. PATENT DOCUMENTS

| 5,281,902 | A | * | 1/1994 | Edelen et al. ............ 318/632 |
| 5,566,070 | A | * | 10/1996 | Mack et al. ............... 701/51 |
| 5,598,334 | A | * | 1/1997 | Shin et al. ................ 701/51 |
| 6,695,747 | B2 | * | 2/2004 | Zimmermann et al. ....... 477/123 |
| 7,155,993 | B2 | * | 1/2007 | Koenig et al. ............. 74/331 |

FOREIGN PATENT DOCUMENTS

DE    10206561    10/2002

* cited by examiner

*Primary Examiner*—David D. Le
(74) *Attorney, Agent, or Firm*—Simpson & Simpson, PLLC (57) ABSTRACT

To improve the safety of automated gearboxes, it is proposed that terminal positions of internal gearshift members and external actuation members be so defined separately from each other that one can recognize whether the engagement of a speed is accompanied by the attainment of a terminal position of an internal gearshift member or an external actuation member. Error analysis is possible in this way. For dual clutch gears, it is additionally proposed that one can, at least in gearshift operations that are critical in terms of safety, disengage on speed of a subgear in a separate procedure, before a new speed of this subgear can be engaged.

10 Claims, 5 Drawing Sheets

PRIOR ART

METHOD FOR ERROR RECOGNITION AND ERROR AVOIDANCE WHEN SWITCHING AN AUTOMATED GEARBOX AS WELL AS AN AUTOMATED GEARBOX

CROSS-REFRENCE TO RELATED APPLICATIONS

This application claims priority of German Patent Application No. 10 2004 042 424.1, filed Sep. 2, 2004, which application is incorporated herein by reference.

FIELD OF THE INVENTION

This invention relates to a method for error recognition when switching an automated gearbox. The invention furthermore relates to a method for error avoidance when switching a parallel gearbox. In addition, the invention relates to an automated gearbox for the performance of the invention-based methods.

BACKGROUND INVENTION

Automated gear boxes are being used increasingly on account of the resultant comfort improvement, but above all, on account of possible of consumption savings in modern motor vehicles.

SUMMARY OF THE INVENTION

The object of the invention is to improve the operational safety of such automated gearboxes.

A first solution of this problem is achieved for error recognition when switching an automated gearbox with switching members, inside the gear, for the switching gear speeds and an actuation device, outside the gear, with at least one actuation member for actuating the switching members, which at least one actuating member can be placed, by a selection actuator, in the engagement position, with at least one of the switching members, and which can be moved by a switching actuator for moving the particular switching member, in which method, one defines terminal switching positions that are assumed by the switching member with whatever speed is set and where terminal actuation positions are defined, up to which at the least one actuation member can be moved for the purpose of switching a speed, whereby the position of the switching member, defined by the terminal actuation position, lies outside the position of the switching member that is defined by the terminal switching member, thus acquiring the position that the switching member or the actuation member reaches when switching a speed and that depends on whether a terminal switching position, a terminal actuation condition, or none of the two of them is attained, one can diagnose an error state of the gear and/or of the actuation device.

According to the invention, a possible error is analyzed and associated by means of the acquisition of the terminal speed position when switching into a new speed and its association with a stop, inside the gear, or a stop outside the gear or located in the actor.

Advantageously, the position of the switching member—as defined by the terminal actuation position of the actuation member—assuming full use of possible tolerances, lies outside the position of the switching member as defined by the terminal switching position.

It is furthermore practical that the terminal switching positions of various speeds differ from each other.

Here it is particularly practical to design the terminal switching position of the reverse speed with a lesser interval from a neutral position than the terminal switching positions from the forward speeds.

Another solution to the problem inherent in the invention is achieved as follows: a method for error avoidance when switching a parallel gear box with two subgears with one, each, clutch, whereby as a result of the selective release of one of the clutches of one of the subgears, in a torque transmission path, between a drive motor and the driven wheels of a vehicle will take effect and at least one of the subgears will display at least one gear step of speed range, in which two speeds can be switched, in which method, one drives with one speed of the at least one switching way of the one subgear, and where, during this driving, in case of switching actions that are critical in terms of safety prior to the engagement of the other speed of the at least one switching way, the one speed of this gear step of speed range, with which the car was driven before, is disengaged in a working step separate from the engagement.

The invention-based method makes it possible to ensure that, in case of switching actions that are critical in terms of safety, for example, in switching actions after a prior change in the direction of movement, dangerous operating states can be avoided.

The above mentioned method is used, for example, in parallel gearboxes, where an actuation device is provided, with one, each, main actuation members and secondary actuation members, associated with the subgear, whereby the main actuation members are provided for moving a particular subgear of the switching for engaging a speed and the secondary actuation members are provided for moving a particular subgear, corresponding to the particular other one of the switching members, for disengaging a speed, a selective actuator for moving the main and secondary actuation members toward different gear step of speed range of the subgears and a switching actuator for moving the main actuation and secondary actuation members for engaging or disengaging a speed, in which method, prior to the engagement of a speed of a subgear, with the help of a main actuation member, the pertinent secondary actuation member, by means of the selective actuator, is moved into the gear step of speed range belonging to the speed and where an engaged speed of the gear step of speed range is disengaged by moving the secondary actuation member with the help of the switching actuator.

Preferably, the method is applied when a reverse speed and a second forward speed are arranged in a first switching gear step of speed range of a subgear and a first forward speed belongs to a gear step of speed range of the other subgear, in which method, after driving in reverse and after subsequent driving forward, in the first speed, prior to the engagement of the second speed, the speeds of the first gear step of speed range are disengaged.

An automated gearbox for the performance of the invention-based method contains switching members, inside the gear, for switching the speeds of the gear, an actuation device, outside the gear, with at least one actuation member for the purpose of actuating the switching members, which at least one actuating member can be moved, by a selection actor, into the engaged position with at least one of the switching members and where a switching actuator can be moved for the purpose of moving the particular switching member, whereby the terminal switching positions are defined, which are the positions that the switching members assume with the particular connected speed and where terminal actuation positions are defined up to which the at least one actuation member can be moved for the purpose of switching a speed, whereby the position of the switching member, defined by the terminal actuation position of the actuation member, lies outside the position of the switching member as defined by the terminal switching position, with sensor devices for acquiring at least the terminal positions of the switching members and the position of the actuation member and an electronic control device for controlling the actuators and for utilizing the output signals of the sensors in accordance with one of the above mentioned methods.

The invention, which can be used in the most widely differing vehicles with the most widely differing driving modes and driving engines and the most widely differing automated gearboxes, is explained below with reference to diagrams by way of example and with other details.

DETAILED DESCRIPTION OF THE INVENTION

Figure 1:
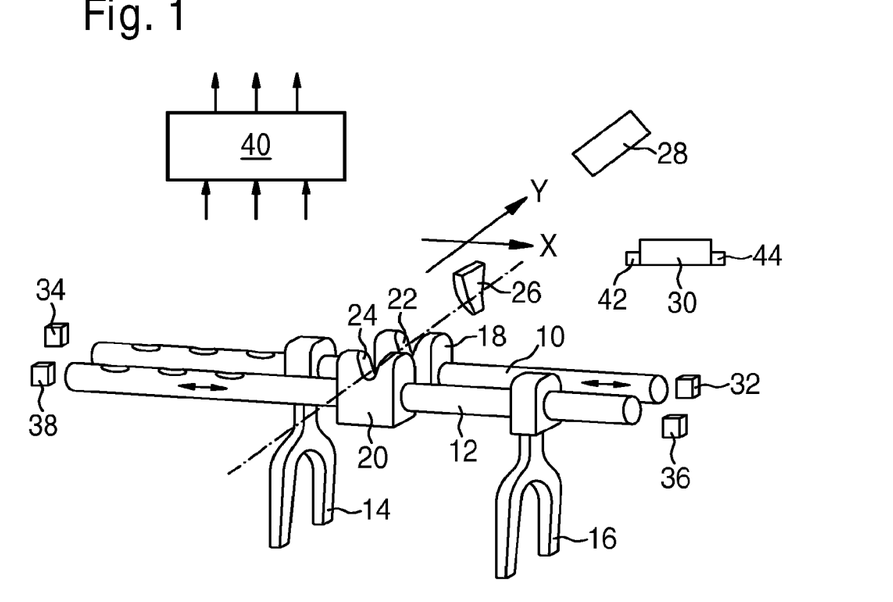
FIG. 1 is a diagram of a known actuation device for an automated gearbox.

According to FIG. 1, a known automated gearbox, not shown, includes a device with switching members, inside the gear, and an actuation device, outside the gear. The switching members, inside the gear, in the example illustrated, contain two mutually parallel movably arranged sliding selector shafts 10, 12 with one, each, gear shift fork 14, 16, and a gearshift block 18, 20, with a recess 22, 24 on the top.

Provided for engagement in a particular one of the recesses 22, 24, is a gearshift finger 26 that, by means of a selection actuator 28, can be moved in a Y direction, laterally to the direction of mobility of the sliding selector shafts 10, 12, and that can be moved, with a gearshift actuator 30, parallel to the movability direction of the sliding selector 10, 12, The gearshift finger 26 is attached in the known manner for example upon a rod that is movably and swingably attached upon a housing of the gear, which rod can be moved with the help of the selection actuator 28 and that can be rotated with the help of the gearshift actuator 30 around its longitudinal axis.

The gear shifting is so done that the gearshift finger 26, which, after the actuation of the selection actuator 28, is in one of the recesses 22, 24, according to the figure, for example, is shifted or swung to the left, whereby the pertinent gearshift fork moves a clutch sleeve that is attached upon a gear shaft and engages a speed. In a further gearshift operation, this speed is disengaged in that the corresponding gearshift block, by moving the gearshift finger 26, is moved back into the selection gear step of speed range and thereafter, depending upon the speed that is to be set, is moved out of the selection gear step of speed range for the purpose of inserting the "opposite" speed with the help of the same clutch sleeve or, where, first of all, from the particular gearshift block, along the selection gear step of speed range (Y direction) is made to engage the neighboring gearshift block (neighboring gear step of speed range) and a speed will be set in that gear step of speed range.

Stops 32, 34, 36, and 38 are provided for the switching device, inside the gear, for the purpose of monitoring the function of the actuation device, and these stops limit the movability of the sliding selector shafts or of the gearshift blocks, rigidly connected into therewith, one or the other X direction. Their attainment is detected for instance in the sudden rise of the power consumption of the selection actuator or by the latter's standstill or directly by correspondingly positioned to terminal switches. The gearshift actuator is turned off when a terminal gear shift position, defined by the stops, is acquired.

The movability of the gearshift finger 26 in the X direction, by means of the switching actuator, is limited by the stops 42, 44. These stops 42 and 44 can be mechanical stops, possibly provided with terminal switches. They can also be "electronic stops" that can be formed by a motion sensor or an increment counter, that acquires the actuator position 30 and that is referenced in predetermined, marked positions, so that the actuator position will be absolutely known. Reaching the stops 42 and 44 is acquired by the control device 40 and results in the termination of the movements of the gearshift finger 26 into the particular X direction upon the attainment of the stop.

Figure 2:
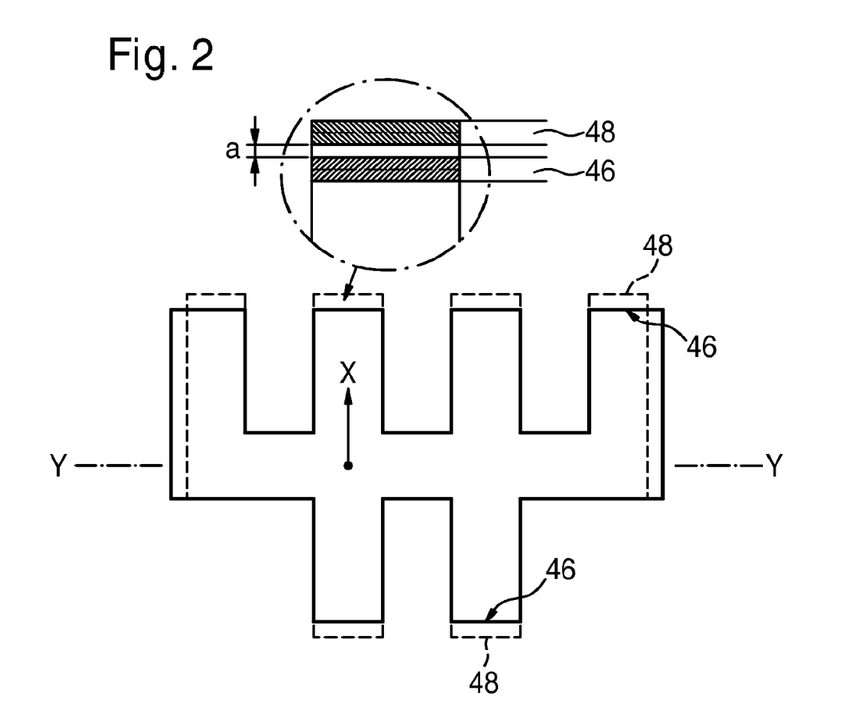
FIG. 2 is a circuit diagram of an automated gearbox with an illustration of the terminal actuation positions.

FIG. 2 illustrates the conditions with reference to a circuit diagram. Y-Y refers to the selection four gear step of speed range. Perpendicularly thereto extend four gear steps of speed range (X direction and FIG. 1), whereby only one speed can be set in the two outer gear steps of speed range. The solid stop lines 46 at the end of each gear step of speed range designate the terminal switching positions of the gearshift forks, defined by the stops, or parts of the gear connected rigidly therewith. The broken stop lines 48, that are further removed from the selection gear step of speed range than the stop lines 46, designate the terminal actuation positions of the actuation device that is outside the gear, that is also defined by mechanical stops, or as explained earlier by electronic stops.

The circled segment in FIG. 2 shows the tolerance bands of the particular terminal positions; here one can make sure that the tolerance band—associated with the stop line 48—of the terminal actuation position of the actuation device (actuator 30), outside the gear, will lie completely outside the tolerance band, within which lie the stops for the gearshift members outside the gear. The interval between the two tolerance bands is labeled a.

A positive measure a, for example, in the millimeter range, must also be guaranteed, considering the elasticities, the leeways, the temperature expansions and the wear and tear throughout the service life for all of the terminal speed positions. It goes without saying that the measurement accuracy must be considered here, that is to say, the accuracy with which one acquires the position of the gearshift actuator 30, for example, by means of an increment counter.

During routine operation, control device 40, when engaging a speed, must acquire a terminal gearshift position that is defined by one of the internal stops (32, 34, 36, 38 in FIG. 1) or by a stop line 46. These terminal positions are stored in a memory of the control device 40. They are recognized, for example, in that the actuator current increases suddenly or that the actuator comes to a halt.

If a terminal gearshift position is exceeded when engaging a speed and when the terminal position, attained upon the engagement of its speed, in the tolerance band 48, lies in the terminal actuation position or is defined by one of the stops 42, 44, this points to a rupture or a deformation in the internal gear shifting. Such a defect can be reported to the driver in which connection one can activate an emergency operation in that one heads for a repair shop when, for example, a different speed can still be engaged without any trouble.

When the gearshift actuator, upon engagement of a speed, moves the gearshift finger 26 or a position going beyond the tolerance band 48, so that no stop is acquired, this points to an error in the incremental path measurement or to a rupture in the external actuation device. There is then an error message including the fact that the system will be turned off.

When, upon the engagement of a speed, the gearshift actuator 30 comes to a halt outside a position defined by the stops 42 and 44, this can be due to a deformation or a rupture of the actuation device, outside the gear, or the internal gearshift in the gear or an error in incremental path measurement. This is followed by a corresponding error message and a system turnoff.

Specifically targeted error diagnosis is thus possible with the help of the described, mutually independent acquisition of the terminal switching positions, inside the gear, and the terminal actuation positions, outside the gear. Furthermore, an emergency run can be activated in certain states so that the system will not have to be turned off unnecessarily.

Differing terminal switching positions or stops can be associated with the individual speeds. When the terminal switching position of the reverse gear for example is closer to the selection gear step of speed range then the terminal switching positions of the forward speeds, then one can make a differentiation between the reverse speed and the forward speed, without having to acquire the particular selection position. The reverse speed can in this way be recognized reliably and quickly as a result of which a clutch, not illustrated, can be released earlier and the speed change can be completed faster.

The method, described here by way of example, can be applied to the selection mechanism in that there are provided stops inside the gear and outside the gear, for example, to limit the movability of the gearswitch finger, in the direction of selection.

The described method can be used both for a conventional automated gearboxes with merely one clutch, where, during a speed change, there is an interruption in the traction force and in parallel gearboxes, where the speed change can be accomplished without any interruption in the traction force.

Figure 3:
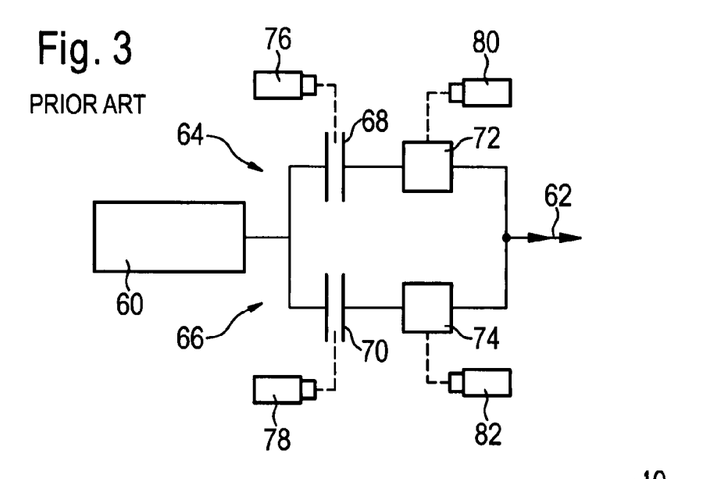
FIG. 3 is a diagram of a known parallel gearbox.
Figure 4:
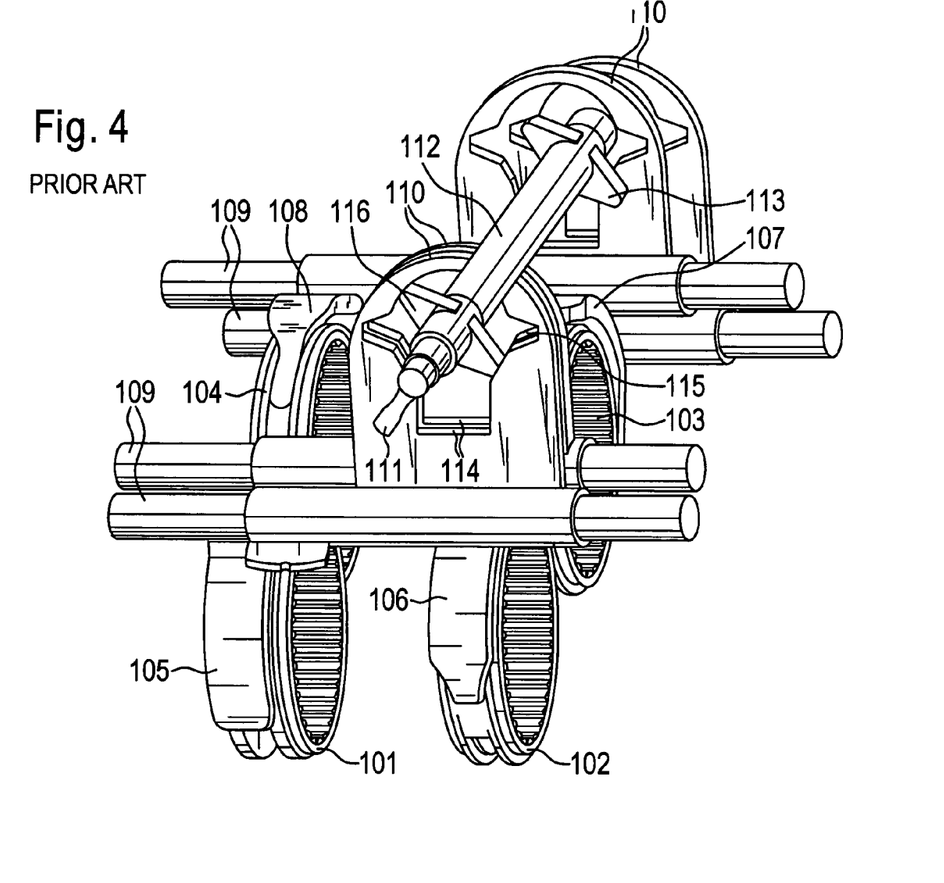
FIG. 4 is a part of an actuation device for a parallel gearbox, shown in a perspective view; and, FIGS. 5 through 7 are circuit diagrams to explain an invention-based method.

FIG. 3 shows the basic structure of such a known parallel gearbox. FIG. 4 shows a part of an actuation device for such a parallel gearbox. The figures are taken from DE 102 06 561 A1 where the operating mode and the actuation of parallel gearboxes are explained in detail.

Between a drive motor 60 and a drive 62, leading to the driven wheels of a vehicle, there are formed two power trains 64 and 66, via which the flow of moments can take place. Associated with each power train is a clutch 68 or 70 and a subgear 72 or 74.

Actuation devices for clutches are labeled 76 or 78. Actuation for subgears 72 or 74 are labeled 80 or 82.

Translation steps, between which change without traction force interruption should be possible, are associated with different subgears. For example, speeds 1, 3, and 5 belong to one of the subgears and speeds 2, 4, 6, and R belong to the other subgear.

FIG. 4 shows parts of an actuation device that is commonly shared by the two subgears 72 and 74 (which actuation device combines the actuation device 80 and 82 in FIG. 3).

Clutch sleeves 101, 102, 103, and 104, connected in a non-rotary manner with shafts of the subgear 72, 74, not shown, are moved by gearshift forks 105, 106, 107, and 108. The clutch sleeves 101 and 104 are associated with one of the subgears. The clutch sleeves 102 and 103 are associated with the other subgear. The external actuation device contains a first main actuation member 111 in the form of a gearshift finger and an additional main actuation member—not visible in FIG. 4—by means of which one can engage speeds. Furthermore, secondary actuation members 113, 116 are provided which make sure that, in each case, all other speeds of the same subgear are disengaged. The gearshift forks 105, 106, 107, and 108 can be moved axially on shafts 109 and their mouths are so designed that they will each time come to engage a main actuation member 111 (gearshift finger) or secondary actuation member 113, 116 that is made in the form of a dual cam. For this purpose there are provided first subsections 114 for connection with a main actuation member 111 and second subsection 115 with a secondary actuation member 113. To engage a speed, for example, main actuation member 111 will connect up with a terminal section 110 corresponding gearshift fork 105 or 106, in that a gearshift shaft 112, provided with the actuation members, is shifted in the axial direction by a selection actuator.

At the same time, the secondary actuation member 113 establishes contact each time with the corresponding gearshift fork 107 or 108 which belongs to the same subgear. A rotation of the gearshift shaft 112 by means of a gearshift actuator will swing the main actuation member 111, by means of the gearshift fork 105 or 106 upon shaft 109 and thus also the pertinent clutch sleeve 101 or 102 is also shifted and the corresponding translation step is engaged. At the same time, the turning of the secondary actuation member 113 will cause the disengagement of the corresponding speed if the latter is engaged. For the actuation device according to FIG. 4, one can define terminal actuation positions that are similar to those explained with reference to FIGS. 1 and 2.

Figure 5:
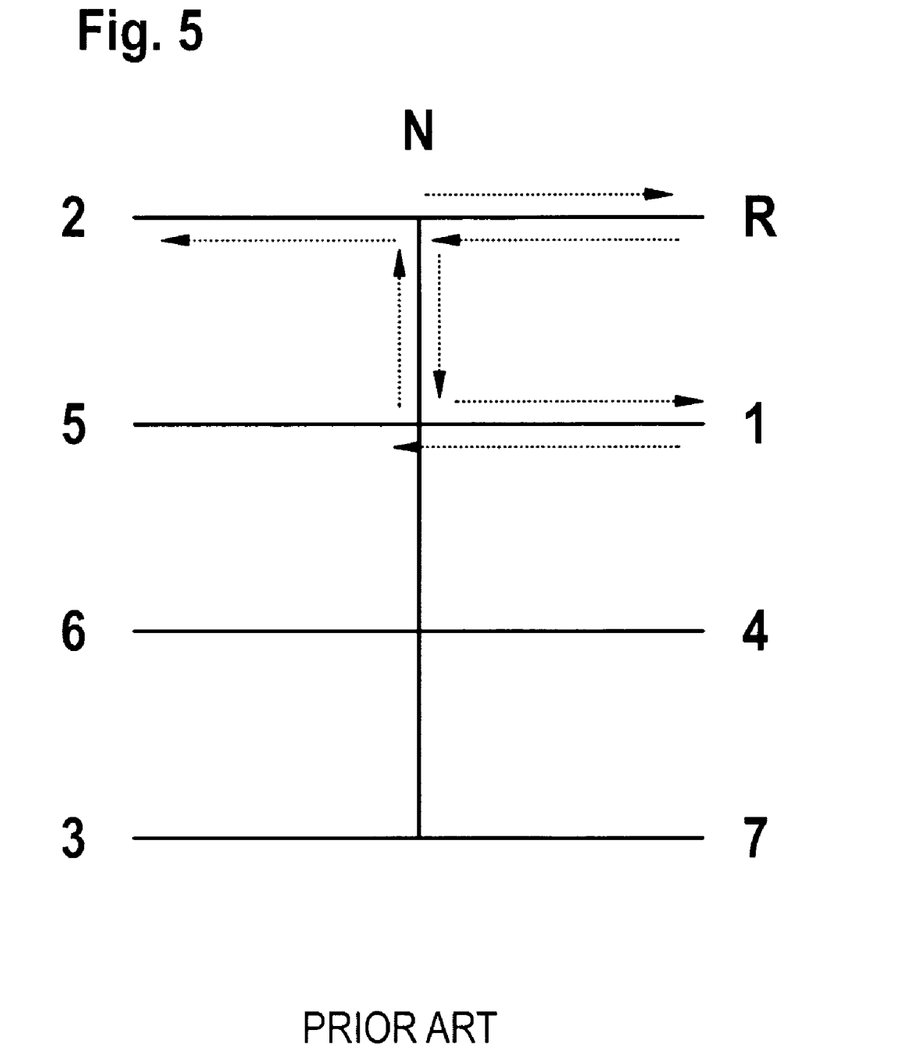

Here is a problem encountered in a dual clutch gear, such as it was described with reference to FIGS. 3 and 4 and such as it is known:

FIG. 5 shows a circuit diagram of such a dual clutch gear, where the perpendicular line designates the selection gear step of speed range. No speed is set when the main actuation member (gearshift finger) is in the selection gear step of speed range, that is to say, the gear is in neutral (N) and the switching shaft can be moved by the selection actuator between the individual gear shift gear steps of speed range that are illustrated horizontally. When the gear shaft is turned into one or the other direction by the gearshift actuator, when a main actuation member is in one of the gearshift gear steps of speed range, then the specified speeds are connected. Here, speeds R, 2, 4, and 6 are associated with one subgear and speeds 1, 3, 5, and 7 are associated with the other subgear.

In the following we will explain a known gearshift procedure with reference to the arrows in FIG. 5, which indicate the movement of the main actuation member. Starting with the neutral position, the main actuation member connects the reverse speed R; then we move back to neutral and we switch back to the other subgear, in which the first speed is engaged from neutral. This can be done while the vehicle is running backward. Afterward this procedure, the main actuation member is moved to neutral and once again there is a change in the gear step of speed range to the other subgear. After the reverse run has been completed, the gear control will release the clutch for the odd subgear and one can drive forward. As of that point in time, the power train to the even subgear is disengaged and one can connect the second speed.

By way of a potential error possibility, as the first speed is engaged, the flow of force to the main actuation element could be broken but the first speed can still be completely engaged when, for example, after the engagement of the first speed, the main actuation member (gearshift finger) wears out or breaks. When the gear is not equipped with the two terminal position limits (inside the gear and outside the gear) according to FIG.

2, but rather only with the terminal position recognition or limitation, outside the gear, then, after such an exemplary rupture or wear of the gearshift finger, the gear control would start from the assumption that the second speed was properly engaged, when the stop, outside the gear, or the selection actuator inside the gear, was recognized as a gearshift path limitation. Actually, the R speed would then always still be engaged in the even subgear. The previously mentioned error is not acquired by the gear control; therefore, the clutch for the even subgear would be released. At that instant, depending on the driving situation, there could be some very dangerous consequences, for example, one could start up in the wrong direction, the wheels could be locked, or the gear could be destroyed.

Figure 6:
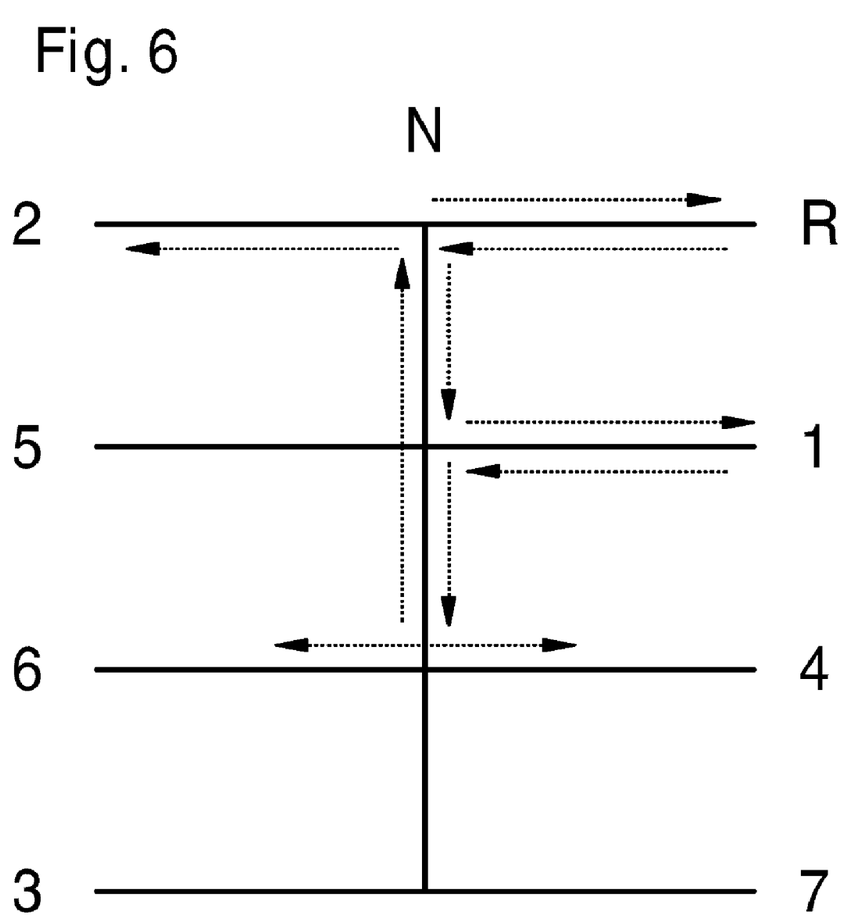

FIG. 6 shows a gearshift procedure intended to solve the above mentioned problem.

The reverse speed R and the first speed are engaged as explained in reference to FIG. 5. Subsequently, however, the main actuation member is moved to the gearshift gear step of speed range 6/4 that belongs to the same subgear as gear step of speed range 2/R. In that position, the gearshift shaft is moved, with the main and secondary actuation members, by way of a rotation angle that corresponds to a disengagement movement. The prerequisite here is that the flow of force exists to the secondary actuation element. Subsequently, the main actuation member is set on neutral and is moved into the gear step of speed range 2/R. There, one now tries according to plan to engage the second speed.

The core of the invention thus is, in coping with potential speed settings in terms of safety, first of all, to move the secondary actuation element into the gear step of speed range that is to be set and to disengage the speeds that are connected there. Subsequently, the main actuation member is moved into the gear step of speed range that is to be set and the gearshift operation as provided is performed.

The prescribed safety switching operation is performed especially when the direction of vehicle movement is changed; but it can also be performed when the gearshift settings are different, where, in case of a failure of the main actuation member, which is described by way of example above, a dangerous gearshift state can occur.

Figure 7:
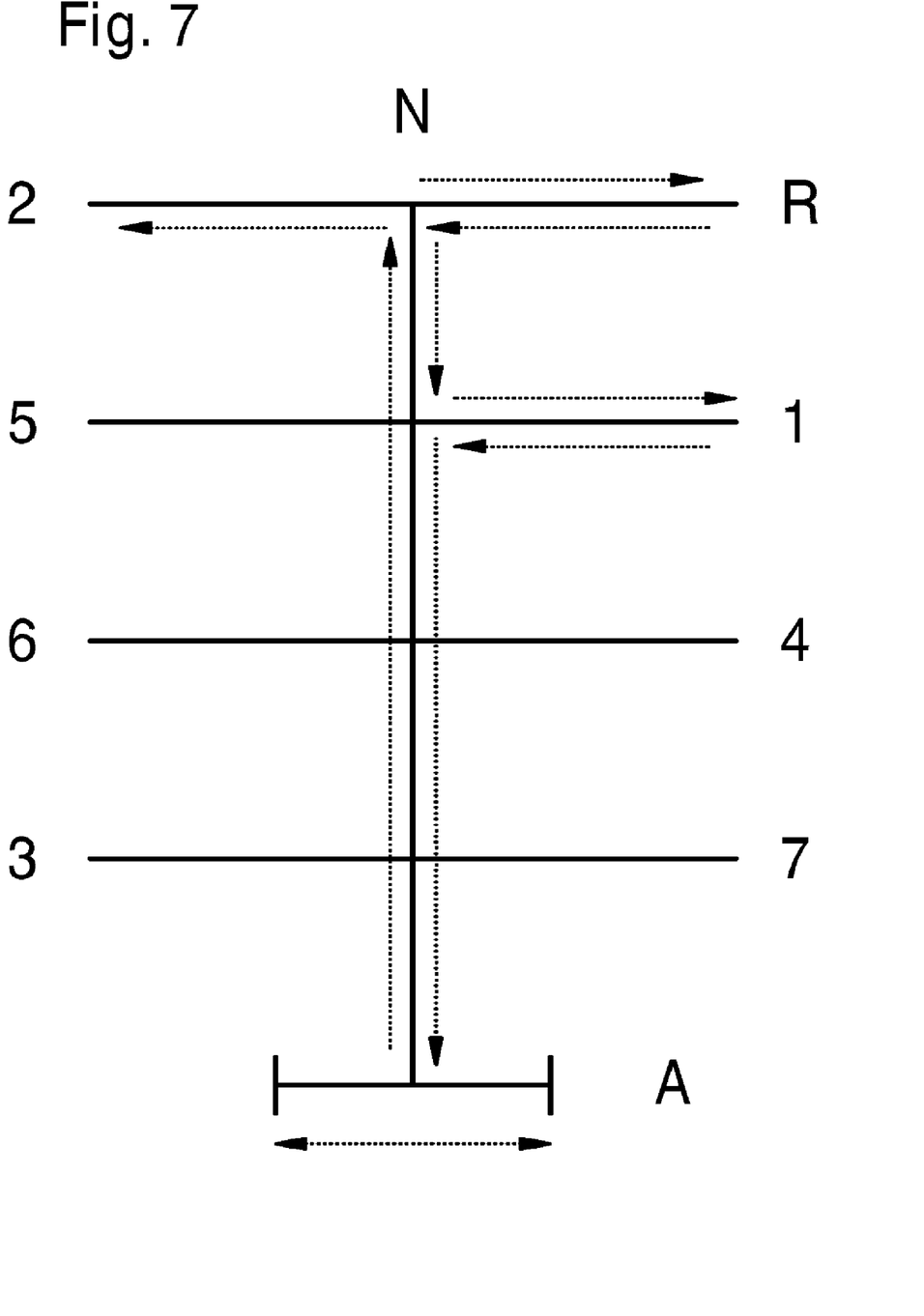

As an alternative to the described method, where a disengagement action can also be performed first in a gear step of speed range of the same subgear, one can, as shown in FIG. 7, start for a neutral disengagement gear step of speed range A, which, among the gear steps of speed ranges of a subgear, has an interval similar to the interval between the gear step of speed ranges of a subgear among each other. The disengagement gear step of speed range must thus be compatible with the "active interlock" that is achieved by the cooperation of the main actuation members and the secondary actuation members.

This neutral gear step of speed range, on account of its limitation, would permit only gear shift angles that correspond to the disengagement path of a speed.

List of References

| 10 | sliding selector shaft | 68 | clutch |
|---|---|---|---|
| 12 | sliding selector shaft | 70 | clutch |
| 14 | gearshift fork | 72 | subgear |
| 16 | gearshift fork | 74 | subgear |
| 18 | gearshift block | 76 | actuation device |
| 20 | gearshift block | 78 | actuation device |

-continued

| 22 | recess | 80 | actuation device |
|---|---|---|---|
| 24 | recess | 82 | actuation device |
| 26 | gearshift finger | 101 | clutch sleeve |
| 28 | selection actuator | 102 | clutch sleeve |
| 30 | gearshift actuator | 103 | clutch sleeve |
| 32 | stop | 104 | clutch sleeve |
| 34 | stop | 105 | gearshift fork |
| 36 | stop | 106 | gearshift fork |
| 38 | stop | 107 | gearshift fork |
| 40 | control device | 108 | gearshift fork |
| 42 | stop | 109 | shaft |
| 44 | stop | 110 | terminal section |
| 46 | stop line | 111 | main actuation member |
| 48 | stop line | 112 | gearshift shaft |
| 60 | drive motor | 113 | secondary actuation member |
| 62 | power takeoff | 114 | subsection |
| 64 | power train | 115 | subsection |
| 66 | power train | 116 | secondary actuation member |

What is claimed is:

1. A method for error recognition during switching a gear of an automated gearbox having at least one gearshift member, inside the gear, for switching speeds of the gear and an actuation device, outside the gear, having at least one actuation member for the purpose of actuating said at least one gearshift member, wherein said at least one actuation member can be moved by a selection actuator into at least one engagement position with said at least one gearshift member and which can be moved by a gearshift actuator for the purpose of moving said at least one gearshift member to at least one gearshift position, comprising the steps of:
    a) defining at least one terminal gearshift position for said at least one gearshift member, wherein said at least one terminal gearshift position corresponds to a particular set speed;
    b) defining at least one terminal actuation position, to establish a movement limit for said at least one actuation member during switching speeds of the gear, wherein said at least one terminal actuation position lies outside said at least one terminal gearshift position;
    c) acquiring said at least one gearshift and engagement positions, attained during switching speeds; and,
    d) diagnosing an error state of the gear or actuation device, wherein said diagnosis compares said at least one terminal gearshift and actuation positions with said at least one gearshift and engagement positions, respectively, and depends on whether said at least one gearshift member attains said at least one terminal gearshift position said at least one actuation member attains said at least one terminal actuation position, or whether neither the at least one terminal gearshift position, nor the at least one terminal actuation position is attained.

2. The method according to claim 1, where the position of gearshift member, defined by the at least one terminal actuation position of the at least one actuation member, when all possible tolerances are fully used up, lies outside the position of the gearshift member defined by the at least one terminal gearshift position.

3. The method according to claim 1, where the terminal gearshift position of different speeds differ from each other.

4. The method according to claim 3, where the terminal gearshift position of a reverse speed has a lesser distance from a neutral position than the terminal gearshift position of a forward speed.

5. An automated error recognizing and avoidance gear box comprising:
    a gear;

at least one gearshift members operatively arranged inside said gear to set a speed of the gear;

an actuation device operatively arranged outside the gear, having at least one actuation member for the purpose of actuating said at least one gearshift members;

a selection actuator operatively arranged to move said at least one actuation member into at least one engagement position with said at least one gearshift members;

a gearshift actuator operatively arranged to move an individual gearshift member to set a particular speed range;

a plurality of terminal gearshift positions wherein said at least one gearshift member is operatively arranged according to the speed of the gear and defines a plurality of first gearshift member positions;

a plurality of terminal actuation positions operatively arranged to limit movement of said at least one actuation member, wherein the positions of said at least one gearshift member defines a plurality of second gearshift member positions, said plurality of second gearshift member positions lie outside of said plurality of first gearshift member positions;

a plurality of sensor means for acquiring said plurality of terminal gearshift positions and said at least one engagement positions; and, an electronic control means for utilizing a plurality of output signals from said plurity of sensors means to detect an error based on said first gearshift member position exceeding said plurality of terminal gearshift positions or said at least one engagement position exceeding said plurality of terminal actuation positions and to control said selection and gearshift actuators based on said detection of said error.

6. A method for error avoidance when switching a parallel gearbox, in a vehicle, with a first subgear including a first clutch and at least one gear step of speed range and with a second subgear including a second clutch and a first step of speed range, wherein the at least one step of speed range includes first and second speeds, and wherein the first step of speed range includes a third speed, comprising the steps of:

moving a first gearshift member to the at least one step of speed range to engage the first speed and to close the first clutch to form a first torque transmission path between a drive motor and driven wheels of the vehicle;

opening the first clutch;

moving the first gearshift member to the first step of speed range to engage the third speed;

moving the first gearshift member to a neutral position;

moving a second gearshift member to disengage the first speed;

moving the first gear shift member to engage the second speed; and closing the second clutch to form a second torque transmission path between the drive motor and the driven wheels.

7. The method of claim 6 wherein the at least one step of speed range includes second and third steps of speed range, wherein the second step of speed range includes the first and second speeds, and wherein moving the second gearshift member to disengage the first speed includes displacing the first gearshift member in the third step of speed range.

8. The method of claim 6 wherein the at least one step of speed range includes second and third steps of speed range, wherein the second and third steps of speed range include the first and second speeds, respectively, and wherein moving the second gearshift member to disengage the first speed includes displacing the first gearshift member in the third step of speed range.

9. The method of claim 6 wherein the gearbox includes a neutral gap and wherein moving the second gearshift member to disengage the first speed includes displacing the first gearshift member in the neutral gap.

10. A method for error avoidance when switching a parallel gearbox, in a vehicle, with a first subgear including a clutch and at least one step of speed range and with a second subgear including a step of speed range, wherein the at least one step of speed range includes first and second speeds, and wherein the step of speed range includes a third speed, comprising the step of:

moving a main gearshift member to shift from the first speed to the third speed to form a first torque transmission path between a drive motor and driven wheels of the vehicle;

moving a secondary gearshift member in the at least one step of speed range to disengage the first speed; and, moving the main gearshift member in the at least one step of speed range to engage the third speed to form a second torque transmission path between the drive motor and the driven wheels.

* * * * *